United States Patent [19]

Radice

[11] 4,034,484
[45] July 12, 1977

[54] DRIVER TRAINING APPARATUS
[75] Inventor: John G. Radice, Binghamton, N.Y.
[73] Assignee: Doron Precision Systems Inc., Binghamton, N.Y.
[21] Appl. No.: 699,380
[22] Filed: June 24, 1976
[51] Int. Cl.² .......................................... G09B 9/04
[52] U.S. Cl. .................................................. 35/11
[58] Field of Search .................................... 35/11 R

[56] References Cited
U.S. PATENT DOCUMENTS

| | | | |
|---|---|---|---|
| 1,723,744 | 8/1929 | McKenna | 35/11 R |
| 2,700,227 | 1/1955 | Arkell et al. | 35/11 R |
| 3,015,169 | 1/1962 | Chedister et al. | 35/11 R |
| 3,071,874 | 1/1963 | Chedister | 35/11 R |
| 3,154,864 | 11/1964 | Jazbutis | 35/11 R |
| 3,266,173 | 8/1966 | Sheridan | 35/11 R |
| 3,478,442 | 11/1969 | Jazbutis et al. | 35/11 R |
| 3,740,870 | 6/1973 | Acker et al. | 35/11 R |
| 3,896,564 | 12/1973 | Dewey et al. | 35/11 R |

Primary Examiner—William H. Grieb
Attorney, Agent, or Firm—Richard G. Stephens

[57] ABSTRACT

A simulated floor-mounted gearshift lever for use in driver trainers to simulate either automatic or manual gearshift operation moves magnets to operate reed switches on a circuit card. Simple and economical mechanical linkage means provides realistic "feel" upon operation of the lever and allows ready conversion between "automatic" and "manual" simulation modes.

24 Claims, 3 Drawing Figures

DRIVER TRAINING APPARATUS

My invention relates to driver training apparatus, and more particularly, to improved simulated transmission control apparatus for use in automobile driver trainers or simulators such as those widely used in many high schools, in some commerical driving schools, and sometimes to test or train truck and bus drivers. Typical driver trainers of these types are shown in U.S. Pat. Nos. 3,266,173 and 3,015,169. To provide optimum training in the operation of a given actual vehicle, it is generally necessary that a simulated car be provided with controls resembling those of the actual vehicle. Because both manual and automatic transmissions are in widespread use in various cars and trucks, it is desirable that a simulated car be useful for training students to operate controls for both types. This has been recognized, and many prior simulated cars have afforded such training, providing a dummy clutch pedal which could be folded out of the way when automatic shifting was desired to be simulated, and providing a steering column-mounted gear shift lever. One such arrangement is shown in a prior U.S. patent I obtained with N. T. Acker, U.S. Pat. No. 3,740,870. One important object of the present invention is to provide a simulated transmission control assembly which is less expensive to construct than the arrangement shown in the prior patent.

The increasing adoption of the use of floor-mounted transmission controls in actual motor vehicles makes it important that dummy floor-mounted transmission controls be provided in simulated cars. Linkage systems of the type shown in the mentioned patent for use with a steering column-mounted shift lever are deemed impractical for use with floor-mounted shift levers. Another important object of the present invention is to provide improved dummy transmission control apparatus simulating a floor-mounted automotive transmission control which is useful for training both manual shifting and automatic shifting.

Operation of a manual shift lever provides a different "feel" than operation of an automatic shift lever, and another object of the invention is to provide improved dummy transmission control apparatus which can more realistically simulate the "feel" of both types of actual vehicle shift levers.

Driver trainers used in classroom environments tend to experience hard use and frequent abuse, and the difficulty of obtaining prompt and efficient maintenance and repair service makes it highly desirable that a driver trainer be as little subject to wear as possible. A further object of the invention is to provide improved dummy transmission control apparatus which is more reliable and less subject to wear.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
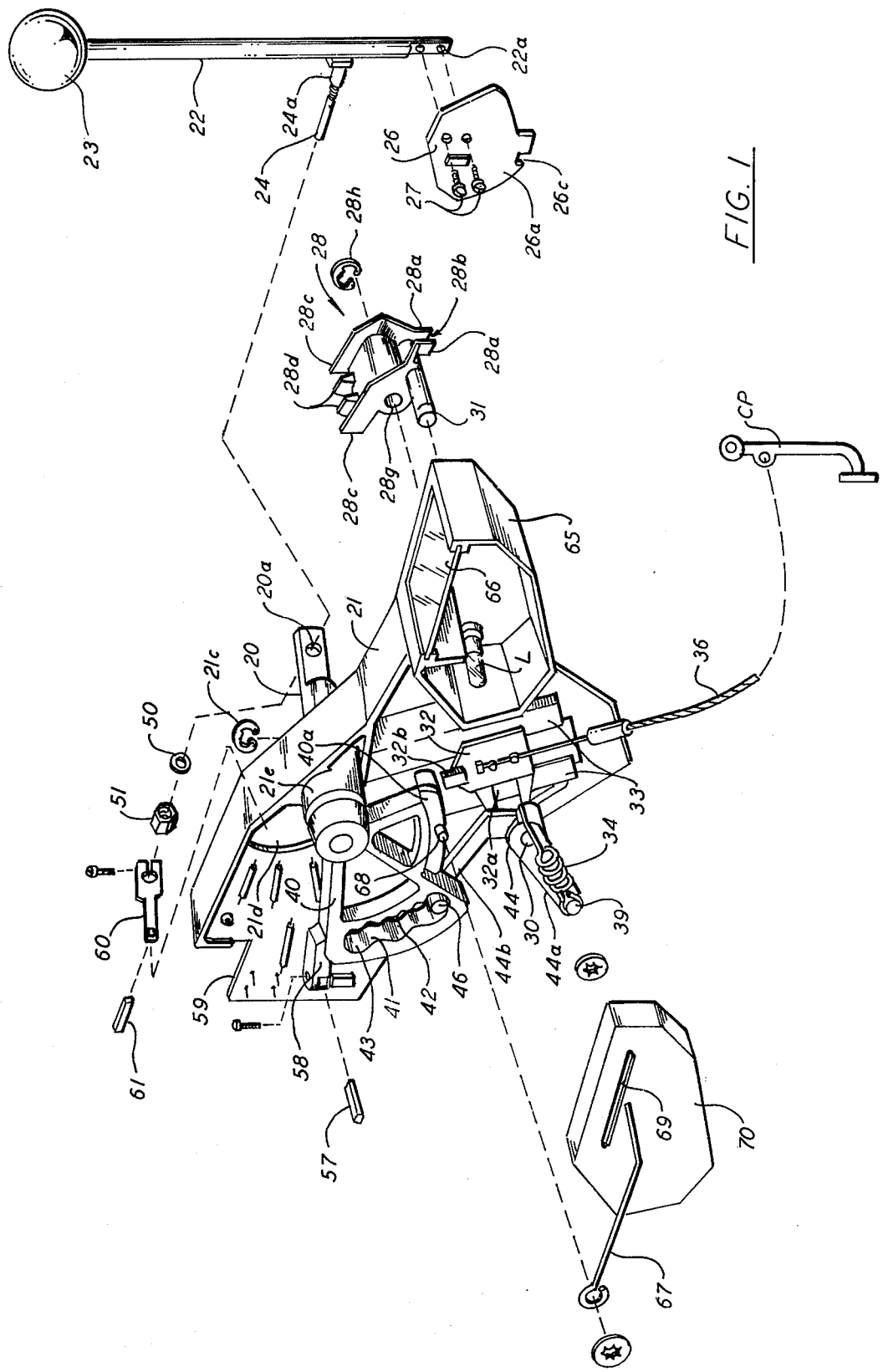
FIG. 1 is an exploded view illustrating a preferred form of apparatus constructed in accordance with the invention.

An understanding of basic principles of the invention can best be had by reference to the exploded assembly view of FIG. 1, from which the assembled form of the device will become apparent. The assembly there shown includes a main casting or frame 21 which is mounted on either side of the student driver's seat, so that the upper edge of frame 21 lies at the approximate level relative to the seat of a transmission control console in a typical vehicle. Casting 21 will be seen to comprise principally a vertical plate portion which mounts several shafts to be described, and one feature of the invention is that the entire transmission control assembly may be laterally thin, so as not to appreciably add to the width of the simulated car. In one successful embodiment of the invention the width of the assembly, measured by the length of the shaft shown at 20, was only 3 inches. The laterally extending horizontal shaft 20 is rotatably journalled in and extends through a hub 21e of frame 21, being retained therein by snap ring 21c, which engages a annular groove in shaft 20 on the side of frame 21 opposite hub 21e. Shift lever 22 carried shift knob 23 at its upper end. Shaft 24 is rigidly affixed to extend perpendicularly rearwardly from lever 22, extending through bore 20a in shaft 20, so that forward portion 24a of shaft 24 is rotatably seated in bore 20a. Such an arrangement will be seen to cause rotation of shaft 20 as shift lever 22 is moved in the fore and aft or longitudinal direction, and to cause rotation of shaft 24 in bore 20a as the shift lever is moved in a sidewise, or lateral direction.

During the "automatic" simulation mode, lever 22 must be restricted to fore and aft motion through a limited range without allowing any lateral motion, and during "manual" simulation both longitudinal and lateral movements of the shift lever must be restricted to predetermined paths, such paths frequently being termed an H-pattern. A guide plate 26 affixed to the flattened lower end 22a of shift lever 22 by screws 27, 27 cooperates with shift pattern cam means 28 to restrict the movement of lever 22. The shift pattern cam means is rotatably mounted on a fixed shaft 30 which is press-fitted into frame 21 and extends laterally therethrough, parallel to main shaft 20. The cam means 28 is shown including a pair of rigid side flanges 28a which define a narrow central groove or slot 28b therebetween at one peripheral portion of the cam means. The width of groove 28b very slightly exceeds the thickness of guide plate 26. If cam means 28 is rotated on shaft 30 to a position such that the arcuate lower edge 26a of guide plate 26 extends within groove 28b, it will be seen that lever 22 will be constrained against lateral movement and restricted to longitudinal movements. However, cam means 28 may be rotated so that a different portion of the cam means engages guide plate 26. This latter portion of the cam means includes three longitudinally-extending grooves defined by cam flanges 28a and bosses 28d. These will be seen to allow lever 22 to be moved longitudinally at any of three different lateral positions of the lever, but not at other lateral positions. Further, the arcuate lower edge of guide plate 26 includes a notch 26c. With such an arrangement, it will be seen that shift lever 22 can be moved laterally only when its longitudinal position causes notch 26c to register with one or the other of bosses 28d. Thus lateral movement of the shift lever is constrained to occur only at predetermined longitudinal positions of the shift lever, as in the case of actual vehicle transmissions shift levers. Now it will be apparent that changing the allowable movements of shift lever 22 for conversion between automatic and manual simulation modes may be readily effected by merely rotating the shift pattern cam means 28 through a predetemined angle, such as 90°.

Fixed shafts 30 extends out both sides of frame 21. The end of shaft 30 on the side of the frame carrying the shift lever extends through bore 28g of shaft cam means 28, which is held on shaft 30 by means of snap ring 28h. Pin 31 on cam means 28 extends through an opening (not visible in FIG. 1) in frame 21 adjacent shaft 30 to extend out the other side of frame 21. In order to rotate cam means 28 through the predetermined angle, pin 31 extends through a slot 32a in a slide plate 32. Slide plate 32 is slidably mounted on frame 21, and retained thereon and guided by ways 33 provided thereon. Ways 33 guide plate 32 for sliding movement radially toward or away from shaft 20. A bell crank 44 having a hub rotatably carried on fixed shaft 30 includes a pair of radially extending arms 44a, 44b. A tension spring 34 extending between pin 39 fixed on the end of arm 44a and pin 31 on the cam means 28 acts as an over-center spring, so that bell crank 44 is forced to rotate to one or the other of two limit positions. Arm 44b of the bell crank carries a pin 46 which extends into a generally arcuate slot 43 in a sector member 40 rigidly affixed to main shaft 20, so that rotation of bell crank 44 is limited to pin 46 striking one side or the other of slot 43. Since pin 31 is captures in slot 32a of the slide plate, movement of the slide plate in one direction toward a center position where pins 31 and 39 and shaft 30 are aligned will increase the tension in spring 34, and upon any further movment past the center position spring 34 will rotate cam means 28 to "snap" bell crank 44 and cam means 28 to their opposite limit positions. In order to rotate the cam means automatically when the clutch pedal is swung between its operating position and its out-of-the-way position, a Bowden or like push-pull cable 36 is connected between the clutch pedal CP and slide plate 32, the casing of the cable being shown fastened to the frame 21 and the core being shown fastened to the slide plate. With such an arrangement, the clutch pedal is arranged to pull outwardly on the core of the cable as the clutch pedal is swung from its storage or unused position down to its relaxed "in-use" position, and then to pull further on the core of the cable as the student depresses the clutch pedal. It will be understood that the dummy clutch pedal CP may be mounted in conventional manner in the simulated car.

The lower edge of guide plate 26 always lies between a pair of flanges or bosses of cam means 28, always being captured by cam means 28 irrespective of which of its two angular positions the cam means may lie in at a given time, and rotation of cam means 28 from one of its angular positions to the other automatically disengages one shifting pattern and engages the other, without any requirement that the shift lever be positioned to any particular position to accomplish changeover from "manual" to "automatic" simulation or vice vera. Side flanges 28a will be seen to converge from their widened spacing at the "manual" portion or range of the cam means to provide the narrow slot 28b portion which engages guide plate 26 during "automatic" simulation. When the clutch is raised in preparation for "automatic" simulation and cam means 28 is thereby automatically rotated, the flanges 28a will be seen to gradually force the shift lever 22 to a central lateral position. When the clutch is lowered in preparation for "manual" simulation, the rotation of cam means 28 will be seen to cause the lower edge of plate 26 to lie between the pair of bosses 28d instead of in slot 28b, of plate 26.

In order to provide a realistic feel during movment of shift lever 22, as well as limiting rotation of bell crank 44 for the purpose previously mentioned, the detent sector 40 is affixed to main shaft 20 to rotate therewith. The detent sector includes two-generally arcuate detent surfaces 41, 42 lying at different radial distances from shaft 20 on opposite sides of the mentioned generally arcuate slot 43. During one simulated transmission mode spring 34 urges bell crank 44 clockwise about the axis of shaft 30, urging pin 46 against the radially inward detent surface, and during the other simulated transmission mode, spring 34 urges bell crank 44 counterclockwise, so that pin 46 on arm 44b engages the radially outward detent surface.

Tension spring 34 will be seen to determine the force with which pin 46 is forced against one or the other of the two detent surfaces, thereby determining in part the resistance to movement or loading which the student feels upon longitudinal movement of the shift lever 22. However, the loading is also determined by the depths of the undulations in the two detent surfaces, and by selection of those surfaces one may provide whatever degree of detent forces one desires. It is important to note that even if one provides large detent forces by use of deep grooves in surface 41 or surface 42, large forces need not be imposed on the shift pattern cam means 28, since that cam is not required to provide the detent forces, or control loading.

Loading the shift lever to resist lateral movement is not deemed crucially important, since little lateral loading of the shift lever is experienced in most vehicles, but it is important that the shift lever not unrealistically fall or flop in a lateral direction from the neutral position when the "manual" mode is being used. This is accomplished very simply by use of spring washer 50 on shaft 24 between shaft 20 and locknut 51. Nut 51 is tightened to compress spring washer 50, thereby providing sufficient friction between lever 22 and shaft 20 to prevent movement of the shift lever in the absence of manipulation by the student.

Figure 2:
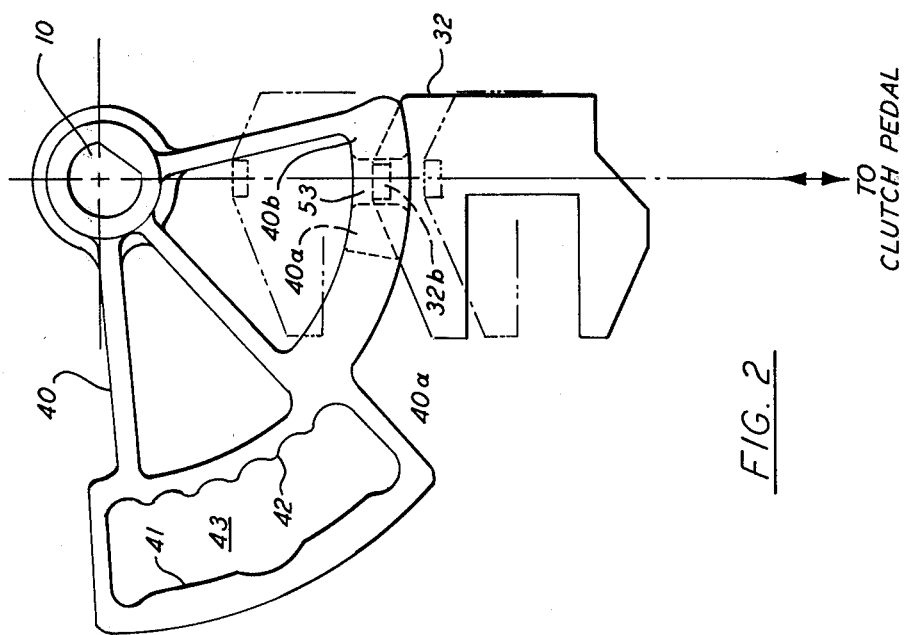
FIG. 2 is a diagrammatic view useful in understanding the operation of the mechanism illustrated in FIG. 1.

It is also important for realism during the manual mode that shifting be prevented unless the clutch pedal is depressed. When the clutch has been swung down into operating position, cable 36 translates slide plate 32 radially away from main shaft 20, and if the clutch pedal is not depressed toward the floor of the simulated car, a boss or pad 32b on slide plate 32 extends into a recess or slot 53 in the arcuate portion 40a of sector member 40, preventing rotation of sector 40, and thereby preventing fore and aft rotation of shift lever 22. This may be better understood from FIG. 2 wherein a portion of sector member 40 and slide plate 32 are diagrammatically shown. Slide plate 32 is shown in full lines at an intermediate position in which boss 32b is captured in a recess 53 formed between a pair of pads or bosses 40a, 40b on the inside of arm 40a of sector member 40. With boss 32b captured in recess 53, the shift lever cannot be moved from the manual "neutral"

position. If slide plate 32 lies the same radial distance from shaft 20, but sector 40 had been rotated, so as to place boss 32b to the left of pad 40a or to the right of pad 40b, it will be seen that movement of the shift lever toward the neutral position would similarly be prevented. Upon depression of the clutch pedal, slide plate 32 is moved slightly radially outwardly from shaft 20 to the lower position shown in FIG. 2, removing boss 31b from the recess 53 of from beside either pad 40a or pad 40b and allowing the shift lever to be moved fore and aft. When the clutch pedal is swung upwardly to the unused position, the movement of slide plate 32 moves boss 32b radially inwardly toward shaft 20 from pads 40a and 40b, to a position where boss 32b cannot interfere with rotation of sector 40, freeing the shift lever for fore and aft movement. In a driver trainer it is deemed highly desirable, particularly to avoid confusion and to save space, that the clutch pedal be swung upwardly out of the way for "automatic" mode simulation, in a direction opposite to that in which the student depresses the pedal to brake the simulated car, and thus the "relaxed" clutch position at which shifting must be prevented lies in between the two clutch positions ("clutch depressed" and "clutch pedal not in use") at which shifting must be allowed to occur, requiring the two opposite directions of clutch pedal movement release the shift lever. In prior systems such as that of the mentioned prior patent provision of such operation required provision of a motion-reversing mechanism, which required a number of added parts, and undesirably required lubrication and maintenance. The requirement for such a reversing mechanism is entirely obviated in the present invention, by use of slide plate 32, which blocks sector 40 at one radial position, but frees sector 40 for rotation at either greater or lesser radial distance of plates 32 from shaft 20.

In order to provide an electrical signal indicating the shift lever position, a first magnet 57 is carried in a bracket 58 on sector member 40, so that longitudinal movement of the shift lever moves the magnet in an arcuate path. A circuit board 59 shown in detail in FIG. 3, carries six magnetic reed switches S1 to S6 arranged in an arcuate array, so that magnet 57 actuates one of the switches S1 to S6 to indicate longitudinal shift lever position. Arm 60 attached to the rear end of shaft 24 extends through an aperture 21d in frame 21 and carries a second magnet 61, which actuates one or another of four reed switches S7 to S10 on the circuit board in accordance with the instantaneous lateral position of the shift lever 22. Thus all of reed switches S1 to S10 lie on the same side of the circuit board. It will be apparent that detection of shift lever position for a wide variety of transmission systems can be accomplished by mere positioning of magnetic reed switches on circuit board 59, and that more or less switches than the number shown may be used.

Figure 3:
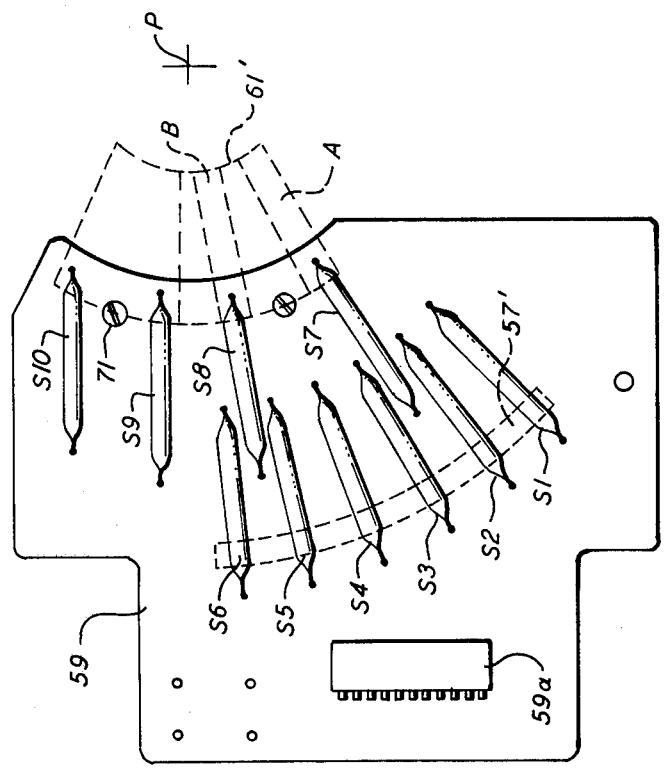
FIG. 3 is a view of an etched circuit card assembly forming a portion of the invention.

In FIG. 3 switches S1 and S6 are shown evenly spaced in an arcuate path at one radial distance from point P, the axis of main shaft 30, and reed switches S7 to S10 are shown spaced in a separate arcuate path at a lesser radial distance from point P, and in each case the body of each reed switch is arranged to extend radially toward the axis of shaft 20. The path which the end of bar magnet 57 describes as the shift lever is rotated between its limit positions is shown in dashed lines at 57' in FIG. 3. Magnet 57 is arranged to pass over portions of switches S1 and S6 which are substantially radially displaced from switches S7 to S10 so that magnet 57 cannot acuate the latter switches. In a typical application all of the magnetic reed switches may have a small diameter of approximately 0.09 inch, and the end of bar magnet 57 may pass over each of switches, S1 to S6 with a clearance of approximately ⅛ inch. It will be apparent that switches S1 to S6 may be angularly spaced about the axis of shaft 20 with the same angular spacing as that provided between adjacent shift lever positions in an automatic transmission, and thus during the automatic simulation mode, operation of a particular respective one of switches S1 to S6 will indicate the instantaneous shift position selected by the student. During the manual simulation mode, switch S1 will be actuated when the shift lever is moved to one longitudinal limit for "first" and "third" gearshift positions, switch S6 will be actuated when the shift lever is moved to the opposite longitudinal limit for "second" and "Reverse" positions, and an intermediate switch S3 or S4 will be actuated when the lever is in the "neutral" longitudinal mid-position.

While bar magnet 57 for sensing fore and aft positions extends substantially perpendicularly to the plane in which switches S1 to S6 are contained, bar magnet 61 for sensing lateral position perferably extends in and sweeps through a plane which is parallel to and spaced from the plane of circuit board 59 and the plane of switches S7 to S10. It can be seen that because shaft 24 to which magnet 61 is affixed passes through shaft 20, magnet 61 also sweeps through an arc centered on shaft 20 during fore and aft movement of the shift lever, and from this one might initially assume that magnet 61 and switches S7 to S10 would be able to sense only longitudinal shift lever position. However, the position of magnet 61 relative to switches S7 to S10 can be seen to depend upon combinations of longitudinal and lateral positions. If the shift lever is in one of its longitudinal limit positions, magnet 61 will lie somewhere within the sector shown in dashed lines at 61', but where it will lie within sector 61' will be seen to depend upon the lateral position of the shift lever, one lateral limit causing magnet 61 to lie at the position shown in phantom at A to actuate switch S7, and the other lateral limit position causing magnet 61 to lie at position B to actuate switch S8. When the shift lever is moved to its other longitudinal limit position, magnet 61 will lie somewhere within the sector shown at 61", and whether magnet 61 will actuate switch S9 or instead switch S10 again will depend upon the lateral position of the shift lever.

Because lateral movement of the shift lever causes magnet 61 to rotate about the axis of shaft 24 and bore 20a, magnet 61 tends to approach slightly closer to the circuit board at the lateral limit positions than it does at the lateral mid-position, the distance of magnet 61 from the circuit board varying with the cosine of the angle from a laterally centered position and the length of arm 60. Because arm 60 has sufficient length to amount magnet 61 sufficiently far from its pivot axis, and because the cosine of the angle varies only slightly over the limits of lateral shift lever motion, however, the change in distance of magnet 61 from the plane of the circuit board is very small, and does not interfere with reliable operation of switches S7 to S10.

In some applications it is desirable to mount a pair of reed switches close together to properly switch at desired shift lever positions, but difficult to avoid actuating both switches of the pair because the magnet 61 must be powerful enough to reliably actuate other switches at other shift lever positions. In accordance with a further feature of the invention, this problem is simply and economically overcome by provision of flux diversion means which automatically tends to "weaken" the effect of magnet 61 in certain positions. In FIG. 3, a ferrous screw shown at 71 is shown interposed between switches S9 and S10. When magnet 61 lies near screw 71, some of its flux is diverted to the screw, varying the strength and shape of the magnetic field intensity pattern, so that the magnet cannot actuate both switches S9 and S10, and will operate one or the other in a discrete manner as lateral shift lever position is changed.

A feature of the construction shown is that the reed switches may be mounted on circuit board 59 using conventional factory circuit board assembly techniques, so that the spacing and orientations of the reed switches on the circuit board can be done rapidly by unskilled labor. This eliminates any need for accurately positioning individual microswitches or rotary switches and connecting wiring to them in the manner heretofore used in the art. Further, the spacing of the reed switches cannot get out of adjustment, and the life of the reed switches is much greater than that of mechanically-operated microswitches or rotary switches. Also, the reed switches provide no detent forces and thus do not affect the "feel" of the control, so control "feel" can be established by the detent surfaces 41 and 42 and spring 34 without regard to any switch detent forces. The terminals of the reed switches are routed by conventional printed or etched wiring (not shown) on board 59 to any desired form of circuit board connector, such as connector 59a shown in FIG. 3. It is a further feature of the invention that all the reed switches may be mounted in one plane, i.e., on one circuit board, saving space and requiring only a single connector 59a, even though one might initially assume that two differently-oriented circuit boards might be required because the shift lever moves with 2° of freedom.

A housing 65 provided on frame 21 functions as a light chamber, carrying internally a small incandescent lamp L, and having a flat translucent plastic screen 66 at its top. Indicia, e.g., the legend "P R N D 2 1," specifying the six automatic mode shift positions is printed on screen 66, and can be seen only when lamp L is illuminated. An indicator rod 67 pivotally mounted on pin 68 on sector member 40 extends through slot 69 in cover 70 of housing 65 lies just below screen 66, being visible only when lamp L is illuminated. Rod 68 will be seen to reciprocate in slot 69 and pivot slightly on pin 68 as the shift lever rotates sector member 40, and slot 69 will maintain the end of rod 67 at a fixed distance below screen 66. Lamp L may be turned on for automatic mode simulation by means of a signal from the computer used with the simulated cars in a manner known in the art, or if desired, a microswitch (not shown) may be positioned to sense movement of cam means 28, slide plate 32, bell crank 44, or even the clutch pedal, to illuminate lamp L during "automatic" mode simulation, and to extinguish the lamp during manual mode simulation.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not a limiting sense.

The embodiments of the invention in which an exclusive property or privilege is claimed are defined as follows:

1. Simulated transmission control apparatus for use in an automotive vehicle driver trainer, comprising, in combination: a frame member; a first shaft journalled for rotation in said frame member; a dummy shift lever pivotally connected to said first shaft; circuit board means fixedly mounted relative to said frame members; a plurality of magnetically actuatable reed switches mounted on said circuit board means; and magnet means connected to be moved by movement of said shift lever to actuate said switches to provide electrical signals indicating the position of said shift lever.

2. Apparatus according to claim 1 wherein said plurality of switches includes first and second groups of switches and said magnet means comprises first and second pemanent magnets, said first magnet being operative to selectively actuate the switches of said first group upon rotation of said first shaft, and said second magnet being operative to selectively actuate the switches of said second group upon pivotal movement of said lever relative to said first shaft.

3. Apparatus according to claim 1 wherein said plurality of switches includes first and second groups of switches, each of said groups being spaced in a respective arcuate path on said circuit board.

4. Apparatus according to claim 1 wherein said circuit board lies in substantially the same plane as said frame member.

5. Apparatus according to claim 1 wherein each of said switches lies in a plane parallel to the plane of said circuit board.

6. Apparatus according to claim 1 having a ferromagnetic member mounted on said circuit board to divert magnetic flux from said magnet means at selected positions of said shift lever.

7. Apparatus according to claim 2 wherein said first shaft includes a through bore extending substantially perpendicularly to the axis of said first shaft and said lever includes a second shaft affixed thereto and extending therefrom, said second shaft being journalled for rotation in said bore.

8. Apparatus according to claim 2 wherein each of said magnets comprises an elongated bar magnet, one of said magnets being arranged to extend substantially perpendicularly to the plane of said circuit board and the other of said magnets being arranged to extend substantially parellel to the plane of said circuit board.

9. Apparatus according to claim 3 wherein both of said groups of switches are mounted on the same side of said circuit board.

10. Apparatus according to claim 3 wherein said reed switches are each oriented to extend substantially radially from the axis of said first shaft.

11. Apparatus according to claim 3 wherein said first group of switches is arranged to be actuated in accordance with the rotation of said first shaft, said second group of switches is arranged to be actuated in accordance with the pivotal movement of said shift lever, and the arcuate path of said first group of switches has a greater radius of curvature than the arcuate path of said second group of switches.

12. Apparatus according to claim 7 having first arm means extending radially from said first shaft and second arm means extending radially from said second shaft, said first magnet being carried by said first arm means and said second magnet being carrried by said second arm means.

13. Apparatus according to claim 7 wherein said frame member includes an aperture and said second arm means extends through said aperture.

14. Simulated control apparatus for use in an automotive vehicle driver trainer, comprising, in combination: a frame member; first and second longitudinally extending shafts mounted in said frame member and extending parallel to each other; a dummy shift lever connected to rotate said first shaft; cam follower means fixed to said shift lever; cam means having a pair of cam patterns spaced apart around portions of its periphery, said cam means being rotatably mounted on said second shaft to be engaged by said cam follower means; a dummy clutch pedal; and mechanical switching means operated by movement of said clutch pedal to rotate said cam means to bring one or the other of said cam patterns into engagement with said cam follower means.

15. Apparatus according to claim 14 wherein said mechanical switching means comprises a crank rotatably mounted on said second shaft; a spring connected between said crank and said cam means; and means for limiting rotation of said crank.

16. Apparatus according to claim 14 wherein said mechanical switching means includes first and second detent means for yieldably resisting movement of said shift lever, said first detent means being operative when said cam follower means engages a first of said pair of cam patterns and said second detent means being operative when said cam follower means engages the second of said pair of cam patterns.

17. Apparatus according to claim 14 having a plurality of magnetically operable reed switches carried on said frame member; and magnet means connected to be moved by rotation of said first shaft for selectively actuating said switches to indicate the position of said dummy shift lever.

18. Apparatus according to claim 14 having a member fixed to said first shaft to rotate therewith and wherein said mechanical switching means includes stop means operative upon movement of said clutch pedal to an intermediate position in between two opposite limit positions of said clutch pedal to engage said member to prevent rotation of said first shaft.

19. Apparatus according to claim 15 wherein said means for limiting rotation of said crank comprises a member affixed to said first shaft, said member having a slot, said crank carrying a pin situated within said slot.

20. Apparatus according to claim 15 wherein said mechanical switching means includes plate means slidably mounted on said frame; and flexible cable means connected between said plate means and clutch pedal to translate said plate means, said plate means engaging said cam means to rotate said cam means upon translation of said plate means.

21. Apparatus according to claim 19 wherein said slot is provided with a pair of detent surfaces, one of said detent surfaces being engaged by said pin on said crank when said cam follower means engages one of said cam patterns and the other one of said detent engaged by said pin when said cam follower means engages the other one of said cam patterns.

22. Apparatus according to claim 20 wherein said cam means includes a pin spaced radially from said second shaft and said plate means include a slot, said pin extending into said slot.

23. Apparatus according to claim 21 wherein said pin extends through an opening through said frame member into said slot.

24. Apparatus according to claim 21 wherein said stop means is slidably mounted on said frame member, and a flexible cable connected between said clutch pedal and said stop means.

* * * * *